(12) United States Patent
Winkler et al.

(10) Patent No.: US 12,695,648 B2
(45) Date of Patent: Jul. 28, 2026

(54) SIGNAL TRANSFER ASSEMBLY WITH CAPACITIVE COUPLING

(71) Applicant: B&R Industrial Automation GmbH, Eggelsberg (AT)

(72) Inventors: Norbert Winkler, Eggelsberg (AT); Manuel Burger, Eggelsberg (AT); Christian Schneider, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 99 days.

(21) Appl. No.: 18/719,615

(22) PCT Filed: Dec. 15, 2022

(86) PCT No.: PCT/EP2022/086027
§ 371 (c)(1),
(2) Date: Jun. 13, 2024

(87) PCT Pub. No.: WO2023/111123
PCT Pub. Date: Jun. 22, 2023

(65) Prior Publication Data
US 2025/0062937 A1 Feb. 20, 2025

(30) Foreign Application Priority Data
Dec. 16, 2021 (AT) ................................ A51008/2021

(51) Int. Cl.
*H04L 25/02* (2006.01)
(52) U.S. Cl.
CPC ................................ *H04L 25/0266* (2013.01)
(58) Field of Classification Search
CPC ...... H03H 11/1291; H03H 7/38; H03H 11/28; H03H 2011/0494; H03H 21/0001;
(Continued)

(56) References Cited

U.S. PATENT DOCUMENTS 6,483,284 B1* 11/2002 Eskeldson .......... G01R 1/06772
324/121 R
7,256,575 B2* 8/2007 Pollock .................... H03H 7/24
324/126
(Continued)

FOREIGN PATENT DOCUMENTS

CN 212111556 U 12/2020
DE 102019009233 A1 4/2021
(Continued)

OTHER PUBLICATIONS

International Preliminary Report on Patentability for Application No. PCT/EP2022/086027, dated Jun. 27, 2024, 15 pages.
(Continued)

*Primary Examiner* — John W Poos
(74) *Attorney, Agent, or Firm* — McCarter & English, LLP

(57) ABSTRACT

A signal transfer assembly has a signal source with a signal source output, a signal sink with a signal sink input, having a signal sink input capacitance, and a communications channel connecting the signal source output to the signal sink input, where the communications channel has a first signal terminal for connecting the signal source output, a second signal terminal for connecting the signal sink input, and at least one ohmic resistor, connected in series between the first signal terminal and the second signal terminal, in order to transfer a source signal into a sink signal, a series connection of at least two capacitors is connected into the communications channel, between the first signal terminal and the second signal terminal and parallel to the at least one ohmic resistor.

9 Claims, 3 Drawing Sheets

(58) Field of Classification Search

CPC .... H03H 21/0012; H03H 7/06; H03H 7/0115; H03H 11/30; H03H 7/40; H03H 19/004; H03H 11/53; H03H 2210/025; H03H 11/126; H03H 7/42; H03H 7/0153; H03H 11/04; H03H 1/0007; H03H 2011/0488; H03H 2210/028; H03H 11/0422; H03H 11/0427; H03H 11/0472; H03H 11/1204; H03H 11/1252; H03H 11/32; H03H 11/42; H03H 11/48; H03H 11/525; H03H 2210/012; H03H 2210/015; H03H 11/1217; H03H 15/00; H03H 19/00; H03H 19/002; H03H 2240/00; H03H 7/0123; H03H 7/03; H03H 7/12; H03H 7/1758; H03H 7/25; H03H 7/255; H03H 7/46; H03H 7/463; H04B 1/10; H04B 1/48; H04B 7/0456; H04B 1/18; H04B 1/44; H04B 7/0617; H04B 1/0475; H04B 5/79; H04B 1/04; H04B 1/16; H04B 7/0413; H04B 1/40; H04B 3/54; H04B 10/40; H04B 1/707; H04B 7/12; H04B 1/30; H04B 3/56; H04B 5/24; H04B 1/525; H04B 1/0458; H04B 3/04; H03K 17/08122; H03K 17/302; H03K 17/56; H03K 17/687; H03K 19/018564; H03K 17/6871; H03K 3/356104; H03K 17/693; H03K 19/017554; H03K 19/20; H03K 3/57; H03K 5/06; H03K 5/151; H03D 3/005; H03D 7/16; H03D 3/008; H03D 2200/0025; H03D 2200/0043; H03D 2200/0088; H03D 2200/009; H03D 7/1433; H03D 7/145; H03D 7/1458; H03D 7/1491; H03D 3/00; H03D 7/00; H03G 1/0029; H03G 3/30; H03G 9/025; H03G 9/18; H03G 3/3042; H03G 3/3052; H03G 7/00; H03G 9/005; H03G 1/02; H03G 3/301; H03G 3/3015; H03G 3/341; H03G 5/165; H03G 5/18; H03G 5/22; H03G 7/08; H03F 2200/294; H03F 2200/331; H03F 2200/372; H03F 3/45188; H03F 1/34; H03F 3/195; H03F 3/45197; H03F 3/24; H03F 2200/513; H03F 2203/45644; H03F 3/45192; H03F 2203/45401; H03F 3/45475; H03F 3/45708; H03F 3/45713; H03F 1/3211; H03F 3/211; H03F 2200/336; H03F 2200/451; H03F 2203/45526; H03F 2203/45488; H03F 2203/45494; H03F 3/19; H03F 1/565; H03F 2200/111; H03F 2200/429; H03F 2200/537; H03F 2203/21109; H03F 2203/21112; H03F 2203/45138; H03F 2203/7209; H03F 3/72; H03F 1/223; H03F 2200/408; H03F 2203/45418; H03F 2203/45424; H03F 2203/45434; H03F 2203/45652; H03F 3/217; H03F 3/245; H03F 3/26; H03F 3/45076; H03F 3/45686; H03F 3/45704; H03F 1/0227; H03F 1/26; H03F 1/52; H03F 2200/171; H03F 2200/321; H03F 2200/333; H03F 2200/405; H03F 2200/534; H03F 2203/45134; H03F 2203/45136; H03F 2203/45201; H03F 2203/45236; H03F 2203/45504; H03F 2203/45521; H03F 220/45591; H03F 3/193; H03F 3/4521; H03F 1/0261; H03F 1/0288; H03F 1/3205; H03F 1/56; H03F 2200/102; H03F 2200/165; H03F 2200/18; H03F 2203/21106; H03F 2203/30031; H03F 2203/30036; H03F 2203/45288; H03F 2203/45302; H03F 2203/45318; H03F 2203/45352; H03F 2203/45356; H03F 2203/45366; H03F 2203/45491; H03F 2203/45492; H03F 2203/45524; H03F 2203/45528; H03F 3/2171; H03F 3/30; H03F 3/3022; H03F 3/387; H03F 3/45; H03F 3/70; H04N 25/78; H04N 25/65; H04N 25/77; H04N 25/778; H04N 25/00; H04N 25/30; H04N 25/673; H04N 25/767; H04N 25/59; H04N 25/771; H04N 5/44; H04N 25/587; H04N 25/589; H04N 25/76; H04N 25/7795; H04N 2209/046; H04N 23/741; H04N 23/815; H04N 25/134; H04N 25/585; H04N 25/70; H04N 25/79; H04N 7/102; H04N 5/455; H04N 7/18; H04N 7/183; H04N 25/618; H04N 25/62; H04N 17/00; H04N 17/04; H04N 21/41422; H04N 23/81; H04N 3/18; H04N 3/26; H04N 5/067; H04N 5/18; H04N 5/205; H04N 5/268; H04N 5/30; H04N 5/38; H04N 7/015; H04N 7/083; H04N 7/10; H04N 7/108; H04N 5/16; H04N 5/265; H04N 5/923; H04N 7/1696; H04N 9/76; H04N 9/7936

See application file for complete search history.

(56) References Cited

U.S. PATENT DOCUMENTS

| | | | |
|---|---|---|---|
| 8,576,928 B2 * | 11/2013 | Allen | H04L 25/4917 |
| | | | 375/257 |
| 10,965,284 B1 | 3/2021 | Chien et al. | |
| 2004/0071219 A1 | 4/2004 | Vorenkamp et al. | |
| 2009/0238257 A1 * | 9/2009 | Steinberger | H04B 3/50 |
| | | | 375/230 |
| 2019/0020363 A1 * | 1/2019 | Park | H04B 1/04 |

FOREIGN PATENT DOCUMENTS

| | | | |
|---|---|---|---|
| EP | 0872961 A1 | 10/1998 | |
| EP | 2306210 A2 | 4/2011 | |
| EP | 3428658 A1 | 1/2019 | |
| EP | 3355077 B1 | 11/2020 | |
| WO | 2013/029651 A1 | 3/2013 | |
| WO | 2016/209559 A1 | 12/2016 | |

OTHER PUBLICATIONS

International Search Report and Written Opinion for Application No. PCT/EP2022/086027, dated Mar. 27, 2023, 12 pages.
Austrian Search Report for Application No. A 51008/2021, dated Jun. 27, 2022, 1 page.

* cited by examiner

SIGNAL TRANSFER ASSEMBLY WITH CAPACITIVE COUPLING

CROSS-REFERENCE TO RELATED APPLICATIONS

This application is a National Stage Entry of International Patent Application No. PCT/EP2022/086027, filed Dec. 15, 2022, which claims priority to Austrian Patent Application No. A51008/2021, filed Dec. 16, 2021, each of which are hereby incorporated by reference in their entirety.

BACKGROUND

The present disclosure relates to a functionally safe signal transfer assembly that comprises a signal source with a signal source output, a signal sink with a signal sink input and a signal sink input capacitance, and a communications channel that connects the signal source output to the signal sink input in an electrically conductive manner. The communications channel has a first signal terminal for connecting the communications channel to the signal source output, a second signal terminal for connecting the communications channel to the signal sink input, and at least one ohmic resistor connected in series between the first signal terminal and the second signal terminal, in order to transfer an electrical source signal originating from the signal source into an electrical sink signal entering the signal sink. The ohmic resistor forms with the signal sink input capacitance of the signal sink a low-pass filter with a filter cut-off frequency, which subjects the source signal to low-pass filtering during transfer to the sink signal.

Safety concepts for technical devices, systems, and apparatuses, for means of transportation, and also for complex, automated systems aim to protect people and/or the environment from malfunctions of a technical system to be monitored. Safe communications channels, via which information about user data, possible damage scenarios, dangers, or even malfunctions of the technical system to be monitored are transferred, are substantial components of safety concepts. Safety sensors such as light barriers and/or emergency stop switches and/or safety light grids are usually used to detect damage scenarios, hazards, or even malfunctions. In this context, safety sensors are also referred to as safe output elements or "signal sources." Preferably, safety sensors communicate via the aforementioned safe communications channels with so-called safe input elements (hereafter referred to as "signal sinks"), wherein a safe input element or a safe signal sink can, for example, be designed as a control unit that is capable of triggering so-called safety functions, such as STO, SSO, etc.

Due to the need to pass on information about a newly occurring or newly detected hazardous situation quickly and reliably, e.g., to a signal sink, the topics of communication and fast and safe data exchange play an important role in the area of functional safety. However, the demand for safe communications channels in combination with the often simultaneous demand for fast data transfer rates often leads to problems. In the present context, "fast" refers to signals with signal frequencies greater than 1 MHz, while signals with signal frequencies of less than 1 kHz are referred to as "slow signals." In this sense, measures and means to ensure safe communications channels often run counter to the desire for fast data transfer. When designing safe communications channels, it is therefore important in many cases to limit the electrical energy that can be transferred via a safe communications channel in the event of a fault. Limiting and/or buffer elements, such as suitable series resistors or flyback diodes, are preferably used for this purpose, but this can have a negative effect on the achievable data transfer rates.

In the area of functional safety, the use of ohmic MELF resistors ("metal electrode leadless faces" resistors) has proven to be particularly effective for this purpose. MELF resistors are usually designed as cylindrical SMD components ("surface-mounted device") with two terminals, wherein their end faces serve as terminal contacts for connection to other components. Although MELF resistors are usually larger and more expensive than chip-type resistors, MELF resistors are used in many applications, in particular in functional safety applications. One of the reasons for this is that good characteristic values can be achieved with MELF resistors in terms of parameters such as pulse load capacity, temperature stability, long-term stability, and dielectric strength, along with precisely specified behavior in the event of a fault (fuse resistance).

For the purpose of limiting the electrical energy that can be transferred via a safe communications channel, MELF resistors are usually connected in series in one communications channel. This type of use of MELF resistors is also referred to as "separation" of communicating (communication) elements—for example, of (safe) signal sources from (safe) signal sinks. Although a connection for data exchange is established via a MELF resistor in the aforementioned manner, the aforementioned signal sources and signal sinks are separated by the MELF resistor in the sense that, in the event of a fault, such as a short circuit in one of the communicating elements, the electrical energy that can be transferred to the other element (i.e., from signal source to signal sink or vice versa) is limited. The term "separation of a signal" is also commonly used for such a scenario, wherein the signal is understood to be the signal to be transferred via the communications channel. The above ideas are also reflected in the EN13849-2 standard, in which fault exclusion is declared permissible for MELF resistors in the event of a short-circuit fault. Therefore, MELF resistors can be used for separations in the area of functional safety. However, the resistor should be designed in such a manner that it is not overloaded even in the event of a fault. This is one of the reasons why MELF resistors are usually larger than 1 kΩ. In many cases, separation by means of MELF resistors can also achieve freedom from feedback between a signal source and a signal sink, which is advantageous in the event of faults in either the signal source or the signal sink.

In the case of communication between a safe signal source and a safe signal sink, signal drivers are often provided in the signal sink. Signal drivers are typically used to improve the transfer quality when transferring electrical signals. In the present context, signal drivers are used for several reasons, among others in order to ensure defined input capacitances in the signal sinks or to ensure that the transfer conditions are always as similar as possible in the case of different wiring of a communications channel. Signal drivers are designed as amplifier circuits, for example, which can have operational amplifiers (OPV's) or transistors. As mentioned, however, signal drivers involve input capacitances ("gate-capacitances").

Particularly when using serially connected MELF resistors to separate signals, the aforementioned input capacitances are important, which can of course not only be caused by the use of signal drivers, but can also arise due to the spatial proximity of electronic components in a signal sink. For example, MELF resistors with serially connected (parasitic) input capacitances of signal sinks can form RC elements. As is known, RC elements represent a possible implementation of a low-pass filter. If a communications channel that transfers a source signal originating from a signal source to a sink signal arriving at a signal sink forms an RC element or a low-pass filter in the manner described, the source signal represents the input signal to the RC element or the low-pass filter, and the sink signal represents the generated output signal. The source signal is subjected to low-pass filtering, which in particular results in attenuation of higher frequencies. For a more detailed description of such an attenuation, a cut-off frequency of the low-pass filter is often used.

If high and therefore fast frequencies are strongly attenuated, they can often no longer be used for the transfer of information. Therefore, the attenuation of frequencies, e.g., due to low-pass behavior, reduces the achievable data transfer speeds.

In general, a cut-off frequency describes a frequency of a transfer system above which the signal amplitude of the output signal falls below a certain value due to the frequency of the input signal. The general concept of cut-off frequency is often equated with the specific −3 dB cut-off frequency, where the signal amplitude of the output signal is limited to $$\frac{1}{\sqrt{2}}$$

times the value or 70.7% signal amplitude of the input signal.

The bandwidth of the communications channel and the data rate or data transfer speed that can be achieved with it are directly related to the −3 dB cut-off frequency of a low-pass filter and thus of a communications channel. As is known, the bandwidth describes the width of the interval between a lower and an upper cut-off frequency for a communications channel. The lower cut-off frequency can also be 0 Hz. In the present context, the bandwidth is understood to be the width of the interval between 0 Hz and the −3 dB cut-off frequency of a communications channel. As is well known from communications engineering, in cases without signal or measurement noise, e.g., white noise, the maximum achievable, error-free data transfer rate $C_N$ is related to the bandwidth B of a transfer channel via the formula $C_N=2B$. From this, it can be deduced that a lower bandwidth results in a lower achievable data transfer speed. This in turn can have the result that fast signals can sometimes no longer be transferred, due to the filter effect introduced into a communications channel by an RC element consisting of a MELF resistor and a signal sink input capacitance.

Similar embodiments are found in the prior art. EP 3 355 077 B1, for example, describes the separation of signals coupled in via optical elements. However, the teaching disclosed in EP 3 355 077 B1 cannot be used for applications in which no optical and therefore light-sensitive components are provided. In addition, WO 2013/029651 A1 describes a potential isolation circuit, wherein the issue of data transfer speed is taken into account. However, WO 2013/029651 A1 does not deal with safe elements or safe communications channels, which is why the specifics of the area of functional safety are not discussed in more detail.

None of the publications cited present considerations that could be used to increase a given bandwidth of a safe communications channel. In particular, the question is not addressed of how an already safe communications channel can be made both more safe and faster by taking appropriate measures.

Therefore, it is an object of the present disclosure to increase the bandwidth of a functionally safe communications channel.

BRIEF DESCRIPTION

This object is achieved according to the disclosure by the features of the independent claims. These describe a signal transfer assembly comprising a signal source having a signal source output, a signal sink having a signal sink input and a signal sink input capacitance, and a communications channel connecting the signal source output to the signal sink input in an electrically conductive manner, wherein the communications channel has a first signal terminal for connecting the communications channel to the signal source output, a second signal terminal for connecting the communications channel to the signal sink input, and at least one ohmic resistor connected in series between the first signal terminal and the second signal terminal, in order to transfer an electrical source signal originating from the signal source into an electrical sink signal entering the signal sink, wherein the at least one ohmic resistor of the communications channel with the signal sink input capacitance of the signal sink forms a low-pass filter with a filter cut-off frequency, which subjects the source signal to a low-pass filtering during transfer into the sink signal. The electrical source signal along with the electrical sink signal can, for example, be present as electrical currents or electrical voltages.

As mentioned, the signal source and the signal sink can be communication elements from the area of functional safety. The signal source can be provided in the form of a safety sensor such as a light barrier, and the signal sink in turn can be provided in the form of a control unit that is capable of triggering and/or executing a safety function of a technical system. As mentioned, the aforementioned ohmic resistor can be a MELF resistor, in order to enable a separation between the signal source and signal sink that is required in many cases and thus freedom from feedback.

As described, the low-pass filter and its filter effect are directly related to the data transfer speed possible in the communications channel, which results from the bandwidth of the communications channel determined by the low-pass filter as described. If the filter cut-off frequency of the low-pass filter is higher, then the bandwidth of the communications channel is higher, as a result of which a higher maximum frequency that can be used for transfer arises, which ultimately allows for higher data transfer speeds and the transfer of faster signals.

According to the disclosure, it is provided for this signal transfer assembly to connect a series connection of at least two capacitors in the communications channel, between the first signal terminal and the second signal terminal and in parallel to the at least one ohmic resistor, which series connection of at least two capacitors raises the filter cut-off frequency of the low-pass filter compared to a communications channel without a series connection of at least two capacitors connected in parallel to the ohmic resistor, and thus reduces the low-pass effect of the low-pass filter. A reduction of the low-pass effect is hence to be understood as a raise of the filter cut-off frequency specified by the low-pass filter. If the filter cut-off frequency is raised, the bandwidth of the communications channel increases, which is accompanied by the aforementioned advantages of increased bandwidths. It is astonishing that the seemingly simple measure of a parallel connection of a series connection of at least two capacitors can achieve a significant improvement in the transfer behavior of the described communications channel.

Since the present disclosure provides for a series connection of a plurality of capacitors for reducing the described low-pass effect, the fault safety in particular can be increased with regard to the fault case "short circuit of a capacitor." The series capacitance resulting from the series connection of a plurality of capacitors with the input capacitance forms a capacitive voltage divider.

In one embodiment, a further ohmic resistor can be connected in the communications channel of the signal transfer assembly, in series to the series connection of at least two capacitors connected in parallel to the at least one ohmic resistor. This measure can be taken to increase the separation, i.e., the freedom from feedback, between the signal sink and the signal source in an advantageous manner. In an advantageous manner, such an ohmic resistor can also be designed as a MELF resistor. Therefore, the design of the aforementioned ohmic resistors as MELF resistors represents a particularly advantageous implementation variant of the present disclosure.

Advantageously, the series connection of at least two capacitors is designed to raise the filter cut-off frequency of the low-pass filter to such an extent that information contained in the source signal and to be transported to the signal sink can be transferred to the sink signal without a loss of information. For this purpose, the capacitances of the capacitors provided in the series connection are advantageously selected to be sufficiently large.

It is well known from communications engineering that a transfer of information can be effected without a loss of information in particular if information-carrying components of a signal, e.g., a sinusoidal component of a signal whose amplitude is modulated for the transfer of information, are not impaired during transfer—for example, attenuated by a low-pass filter. If the series connection of capacitors according to the disclosure now ensures that the raised filter cut-off frequency is above the frequencies of all information-carrying signal components of a source signal, the information-carrying signal components are obviously no longer or only slightly impaired. Thus, the transfer of information is possible, at least to a large extent, without a loss of information.

Within the framework of the disclosure, it has further been found that it is advantageous to select the capacitance of each capacitor provided in the series connection to be greater than the capacitance of the signal sink input capacitance by at least a predefined factor. In particular, the factor can correspond to at least twice the number of capacitors provided in the series connection. This ensures that the filter cut-off frequency resulting from the series connection of capacitors is always higher than the original cut-off frequency of the original communications channel.

Particularly, the aforementioned predefined factor can be greater than $1+\sqrt{2}$ times, or greater than 10 times, or greater than 100 times the number of capacitors provided in the series connection. In this manner, it arises that the amplification of the communications channel, or the value of the magnitude response of the frequency response of the communications channel, exhibits only at very high frequencies a low-pass behavior that is unavoidable in practice.

However, in another embodiment, the predefined factor can also be chosen to be less than 1,000 times, or less than 500 times, or less than 300 times the number of capacitors provided in the series connection.

Because the resulting total capacitance of a series connection of capacitors is smaller than the smallest individual capacitance of the respective capacitors, it follows that a sufficiently large total capacitance of a series connection leads to sufficiently large individual capacitances. Within the framework of the present disclosure, the capacitances of the capacitors provided in the series connection are therefore always selected to be large enough that each individual capacitor in the series connection alone would cause an increase in the filter cut-off frequency that would ensure transfer of the source signal to the sink signal without a loss of information. This means that, even if only a single, selected capacitor from the series connection of capacitors were connected in parallel to the ohmic resistor of the communications channel, this single, selected capacitor would also cause the filter cut-off frequency to be raised sufficiently.

This is particularly advantageous for circuits of functional safety. Thus, even in cases where all but one capacitor in the series connection of capacitors has a defect in the form of a short circuit, intact communication via the communications channel can still be ensured. For this reason as well, the functional safety of a signal transfer assembly is improved by the present disclosure, not only with regard to the limited electrical energy that can be transferred, but also due to the fact that, even if all but one capacitors fail, sufficiently fast transfer can still be guaranteed.

Furthermore, in many cases it proves advantageous to connect a flyback diode to the first signal terminal and/or the second signal terminal of the communications channel of the signal transfer assembly according to the disclosure. In this manner, the communications channel can be protected against overvoltages.

Furthermore, it is often advantageous to arrange a signal driver in the signal sink at the signal sink input, e.g., to amplify the sink signal transferred via the communications channel or to be able to ensure a defined transfer behavior via the communications channel even with different further circuits of the signal transfer assembly. In such cases, the signal driver usually introduces a signal driver input capacitance into the signal transfer assembly, which then significantly forms the signal sink input capacitance or can be the main cause of the signal sink input capacitance.

It is to be noted that a signal driver can also be arranged at a different position—for example, outside the signal sink. Within the framework of the disclosure, it has been recognized that good signal transfer can be achieved in particular if the spatial distance between the signal driver and the ohmic resistor of the communications channel is small. For this purpose, the signal driver can advantageously be arranged at a distance from the ohmic resistor of the communications channel that is less than half the length of the communications channel, or, advantageously, at a distance from the ohmic resistor of the communications channel that is less than a third of the length of the communications channel, or, advantageously, at a distance from the ohmic resistor of the communications channel that is less than a quarter of the length of the communications channel.

The present disclosure can be used in the described form, in particular in the field of functional safety. The disclosure allows safe protection of safe communication elements, in particular against overvoltages that occur in other communication elements that are electrically connected to them.

BRIEF DESCRIPTION OF THE DRAWINGS

The present disclosure is explained in greater detail below with reference to FIGS. 1a through 3b, which show, by way

Figures 1A, 1B:
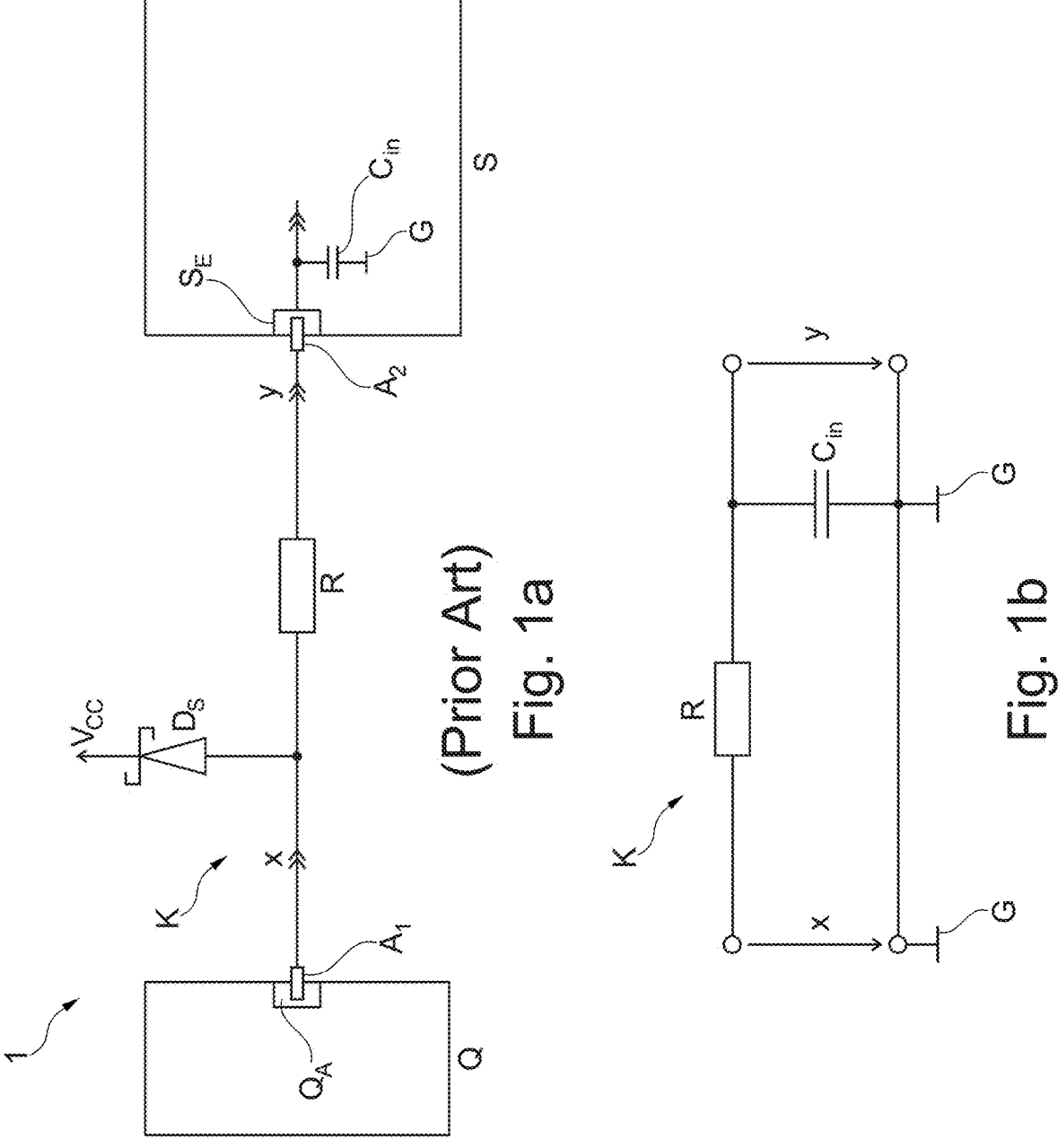
Figures 2A, 2B:
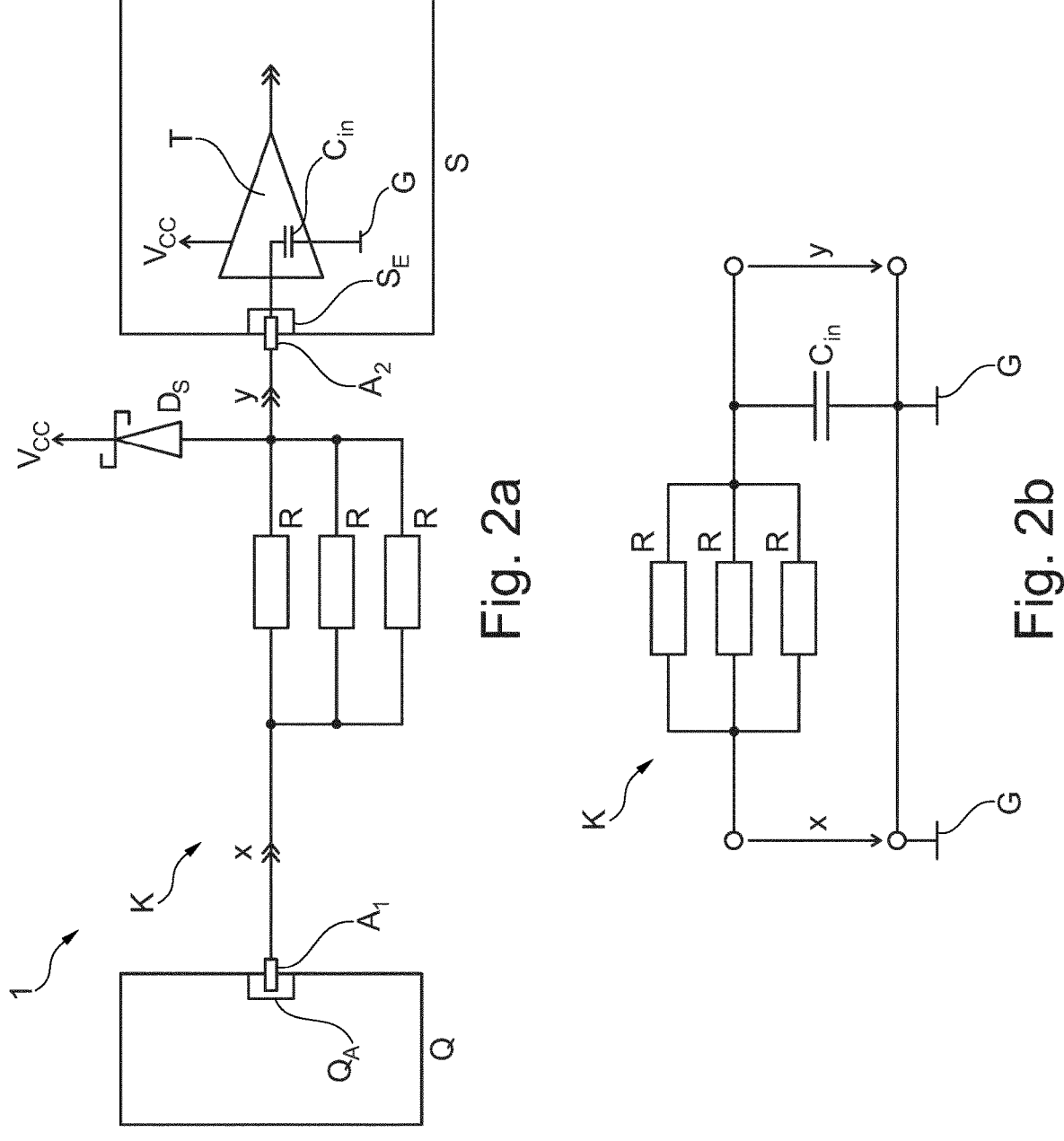
Figures 3A, 3B:
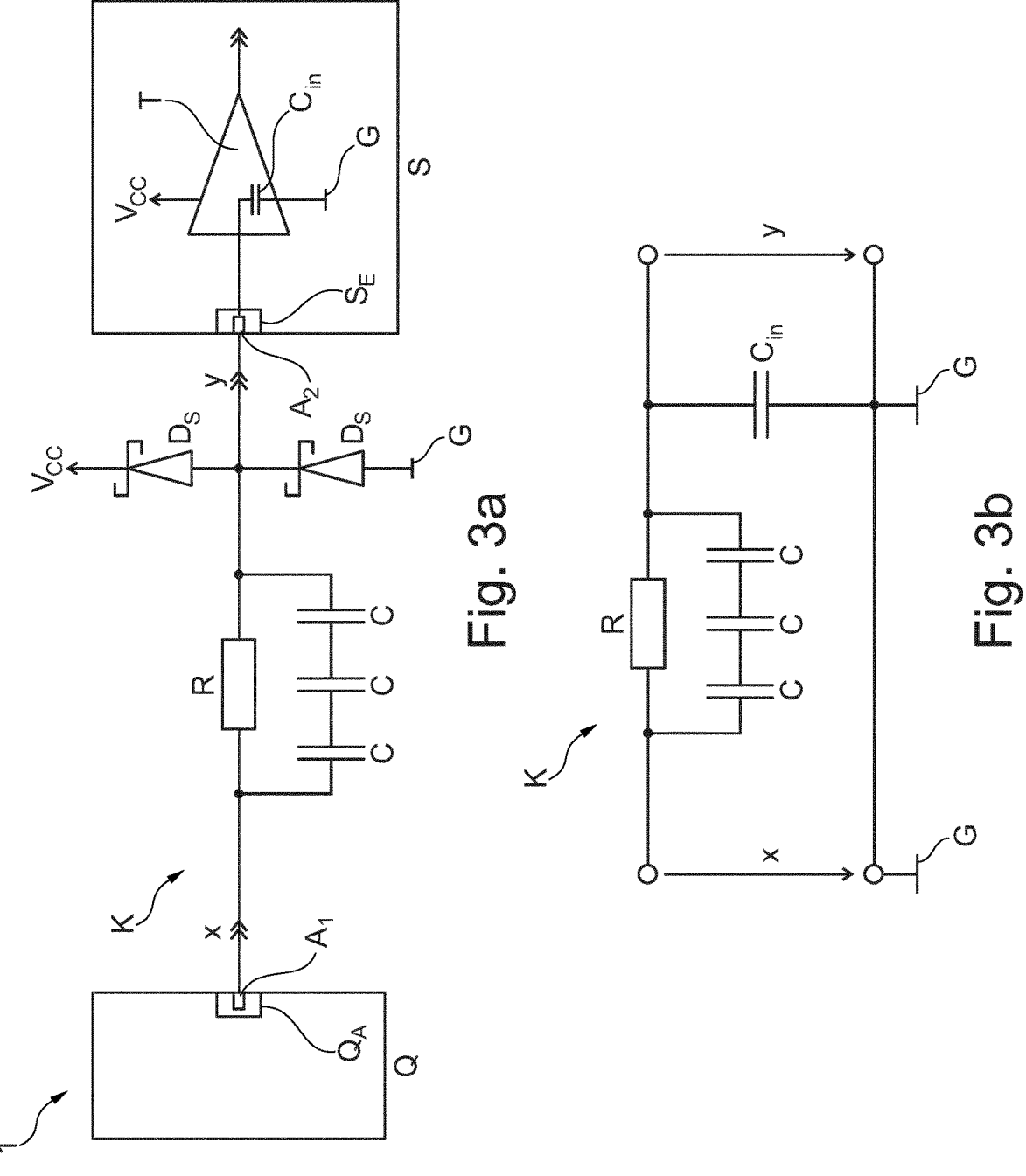

7 of example, advantageous embodiments of the disclosure in a schematic and non-limiting manner. In the figures:

FIG. 1*a* shows the separation of a slow signal (state of the art),

FIG. 1*b* shows a low-pass filter in the form of an RC element, as is created in the embodiment shown in FIG. 1*a*, FIG. 2*a* shows the separation of a fast signal by means of MELF resistors connected in parallel, FIG. 2*b* shows a low-pass filter, as is created in the embodiment shown in FIG. 2*a*, FIG. 3*a* shows the separation of two circuit components according to the disclosure, and FIG. 3*b* shows a low-pass filter resulting from the separation according to the disclosure along with a capacitive voltage divider resulting from the separation according to the disclosure.

DETAILED DESCRIPTION

FIG. 1*a* shows a first approach known from the prior art for separating an electrical signal x. The signal transfer assembly 1 shown in FIG. 1*a* comprises a signal source Q with a signal source output $Q_A$, a signal sink S with a signal sink input $S_E$, and a communications channel K connecting the signal source output $Q_A$ to the signal sink input $S_E$. As already explained, the separation of the signal x is to be understood in particular as the limitation of the electrical energy that can be transferred via the communications channel K. As mentioned, it is essential for the present disclosure that the signal sink S has a signal sink input capacitance $C_{in}$. As mentioned, the cause of the signal sink input capacitance $C_{in}$ can be the use of a signal driver T, but also be due to other electronic reasons (in particular, the spatial proximity of electronic components in the signal sink S).

In the embodiment shown in FIG. 1*a*, the communications channel K has a first signal terminal $A_1$ for connecting the communications channel K to the signal source output $Q_A$, a second signal terminal $A_2$ for connecting the communications channel K to the signal sink input $S_E$, and at least one ohmic resistor R connected in series between the first signal terminal $A_1$ and the second signal terminal $A_2$. In this manner, an electrical connection between the signal source Q and the signal sink S is ensured, making it possible to transfer a source signal x originating from the signal source Q to a sink signal y entering the signal sink S.

As mentioned at the outset, resistors such as the ohmic resistor R shown in FIG. 1*a* can be designed as MELF resistors. In the manner shown in FIG. 1*a*, separation of the signal source Q from the signal sink S is ensured, wherein a connection between signal source Q and signal sink S for data exchange is established via the resistor R, but the electrical energy that can be transferred in the event of a fault is limited.

In the embodiment shown in FIG. 1*a*, a flyback diode $D_S$ is connected to the first signal terminal $A_1$ of the communications channel K in order to protect the communications channel K from overvoltages. However, such a flyback diode $D_S$ can also be connected to the second signal terminal $A_2$ or to both signal terminals $A_1$ and $A_2$. On the side where the flyback diode $D_S$ is arranged, overvoltage protection is ensured by the flyback diode $D_S$, while the serial MELF resistor R limits the current flowing via the communications channel K.

Further, it is crucial for the present disclosure that the ohmic resistor R forms with the signal sink input capacitance $C_{in}$ of the signal sink input $S_E$ an RC series connection ("RC element"), i.e., a low-pass filter ("RC low-pass filter"), which low-pass filters the source signal x during transfer into the sink signal y. An RC element, as it arises for the embodiment shown in FIG. 1*a*, is shown in FIG. 1*b*. As is known, the −3 dB cut-off frequency for such an RC element results in $$f_C = \frac{1}{2\pi} \frac{1}{RC_{in}}.$$

It is immediately apparent that larger resistors R and larger input capacitances reduce the cut-off frequency, which, corresponding to the above embodiments, has a direct negative effect on the bandwidth and the associated data transfer speed.

One approach to solving this problem is to connect several resistors R in parallel, as shown in FIG. 2*a*. In this case, in the signal sink S, a signal driver T is also arranged, which is connected to the signal sink input $S_E$, in which the input of the signal driver T is connected in an electrically conductive manner to the signal sink input $S_E$. For example, the signal driver T can be used to amplify the sink signal y transferred via the communications channel K, which can prove advantageous in many cases. In the case shown, through the signal driver T, a defined signal sink input capacitance $C_{in}$ is introduced into the circuit shown. By using a signal driver T, a uniform low-pass behavior can also be ensured for different signal sinks S. In the circuit shown in FIG. 2*a*, the flyback diodes $D_S$ also ensure that the transferred signal y remains within the permissible input voltage range of the signal driver T. The flyback diodes $D_S$ can also be replaced, for example, by clamping diodes in the signal driver T, which are well known from electronics.

Due to the parallel connection of the resistors R in question, the total effective resistance decreases according to the rule $$R_{ges} = \frac{1}{\frac{1}{R} + \frac{1}{R} + \frac{1}{R}},$$

which, according to the aforementioned formula, results in the −3 dB cut-off frequency $f_c$ of the communications channel K. This also increases the bandwidth of the communications channel K. However, other problems arise when several MELF resistors are connected in parallel. In particular, parasitic capacitances due to the metal electrodes of MELF resistors lead to a further reduction in the −3 dB cut-off frequency, and thus the bandwidth, etc. For this reason, a parallel connection of a large number of MELF resistors is not a solution to the problem of fast transfer of a large number of fast signals.

FIG. 2*b* shows, for the signal transfer assembly 1 shown in FIG. 2*a*, the resulting equivalent circuit diagram for the resulting RC element. The effect of the parallel resistors R in reducing the effective total resistance is immediately apparent.

The solution according to the disclosure to the problem described is shown in FIG. 3*a*. In the embodiment shown, a connection between signal source Q and signal sink S is established by means of three capacitors C connected in series, which are connected in parallel to the resistor R shown above.

However, as mentioned, the series connection of capacitors according to the disclosure can also be realized by any other plurality of capacitors, in particular as a series connection of two capacitors, or as a series connection of four or more capacitors.

Capacitive coupling of the signal x to be transferred is effected via the capacitors C. The signal x is transferred to the sink S via at least two or, as in the present case, three capacitors C (capacitive coupling). Through the present disclosure, capacitors C are also used to separate signals, e.g., between a signal source Q and a signal sink S, instead of one or more high-impedance MELF resistors as previously. This leads to a significant increase in the possible bandwidth B for signal transfer. Through this separation of the input signal x with the aid of capacitors C according to the disclosure, significantly faster signals can be transferred.

The transfer of significantly faster signals means that information-carrying source signals or information-carrying signal components of source signals can have significantly higher frequencies, in particular above 1 MHz, and yet are not influenced by the communications channel in such a way that a loss of information is to be expected—for example, by an attenuation of the amplitude of the sink signal y due to low-pass behavior. For example, if the source signal x is a square wave signal with a fundamental frequency of 1 MHz, the resulting filter cut-off frequency is advantageously well above 1 MHz—for example, at 5 MHz or 10 MHz or above.

In principle, it is advantageous within the framework of the present disclosure to set the resulting filter cut-off frequency to a frequency that is more than three times or more than five times or more than ten times as high as the frequency of an information-carrying signal component of the source signal.

The circuit resulting in this case is shown in FIG. 3b. If, for the circuit shown in FIG. 3b, as is well known from electrical engineering, a total capacitance of the series connection of the given capacitors is calculated as $$C_{ges} = \frac{C}{3},$$

a simple calculation shows that the magnitude response of the frequency response of the now given communications channel K can no longer fall below the value $$1 - \frac{C_{in}}{C_{ges} + C_{in}}.$$

This minimum value of the magnitude response is reached only when the frequency reaches infinity, i.e., $f \rightarrow \infty$. Moreover, the minimum value of the magnitude response can be freely selected by specifying the capacitors C connected in parallel, which is an important advantage of the present disclosure. For example, it is possible to select where the magnitude response is to assume the value of $$\frac{1}{\sqrt{2}},$$

which defines the −3 dB cut-off frequency $f_c$ and thus the bandwidth. The aforementioned limit value can also be set above $$\frac{1}{\sqrt{2}},$$

which means that, in an ideal situation, there is no −3 dB cut-off frequency $f_c$.

Regarding the specific selection of the capacitances of the capacitors C, it is advantageous to select the capacitance of each capacitor C provided in the series connection to be greater than the capacitance of the signal sink input capacitance $C_{in}$ by at least a predefined factor, which corresponds to at least twice the number of capacitors C provided in the series connection. In particular, the predefined factor can be greater than $1+\sqrt{2}$ times, or greater than 10 times, or greater than 100 times the number of capacitors C provided in the series connection. With two capacitors provided in the series connection, for example, the factors $2 \cdot (1+\sqrt{2})$ or 20 or 200 arise, so that the capacitances of the capacitors C are each greater than $2 \cdot (1+\sqrt{2}) \cdot C_{in}$ or $20 \cdot C_{in}$ or $200 \cdot C_{in}$.

In this manner, it is ensured that the amplification of the communications channel K, or the value of the magnitude response of the frequency response of the communications channel K, approaches the value $$\frac{1}{\sqrt{2}}$$

only for very high frequencies, or, as mentioned, comes to lie above this value at all within the framework of an idealized view.

With regard to the selection of the aforementioned limit value $$\frac{1}{\sqrt{2}},$$

it should be noted that this is an idealized, theoretical consideration. As is known, each real transfer system has a cut-off frequency, such as a −3 dB cut-off frequency $f_c$ (in extreme cases, low-pass behavior and the associated cut-off frequency occur at the latest when electrons can no longer follow the movements associated with very high frequencies due to their inertia, and thus the transferred amplitudes become lower).

Thus, selecting a limit value above $$\frac{1}{\sqrt{2}}$$

only, in an idealized, theoretical view means that there is no longer a −3 dB cut-off frequency $f_c$ defining a bandwidth. In the practical implementation of a signal transfer assembly 1 according to the disclosure, a −3 dB cut-off frequency $f_c$ will of course still occur, albeit with a very high value.

In an advantageous manner, a minimum filter cut-off frequency $f_{c,min}$ can be specified for designing the capacitances of the series connection, and the series connection of at least two capacitors C can be designed to raise the filter cut-off frequency $f_c$ of the low-pass filter above the specified minimum filter cut-off frequency $f_{c,min}$.

The minimum filter cut-off frequency may be above a signal frequency of the source signal, in particular a signal frequency of an information-carrying signal component of the source signal, so that the information transported by the source signal is not impaired by the filter effect of the low-pass filter.

The use of three capacitors C represents another embodiment. In this manner, there are no adverse effects due to parasitic effects, as is the case with the aforementioned parasitic capacitances of MELF resistors. This embodiment is advantageous for other reasons, among others because a short circuit of a capacitor according to standard EN13849-2 cannot be ruled out, and therefore fault safety is increased by a series connection of a plurality of capacitors C.

The use of a plurality of capacitors connected in series increases the fault safety of the fast transfer. Since the total capacitance of a series connection of capacitors is smaller than the smallest individual capacitance, the effective total capacitance increases if individual capacitors fail. If the total capacitance of a series connection of capacitors according to the disclosure is large enough to ensure sufficiently fast transfer of a signal via the communications channel, this fast transfer is also ensured if only some of the capacitors provided are still effective because capacitors have failed due to a short circuit. This fact in particular is of great value for the practical application of the signal transfer assembly according to the disclosure.

In a further possible embodiment of the present disclosure, it is also conceivable to connect a further ohmic resistor in series to the at least two capacitors C connected in parallel to the ohmic resistor R. As a result, the approach described above of resistors parallel to the original resistor R can be combined with the use according to the disclosure of parallel capacitors C.

However, the ohmic resistor R cannot be completely replaced by capacitors C, since, in many cases, it is also necessary to transfer static signal levels, which is not possible with a purely capacitive coupling.

The present disclosure ensures that, while simultaneously increasing the bandwidth of a communications channel K, the influence in the event of an error, e.g., between the signal source Q and the signal sink S, can be kept as low as possible and can even be completely eliminated in certain situations.

The invention claimed is:

1. A signal transfer assembly, comprising a signal source having a signal source output, a signal sink having a signal sink input and a signal sink input capacitance, and a communications channel, which connects the signal source output to the signal sink input in an electrically conductive manner, wherein the communications channel has a first signal terminal configured to connect the communications channel to the signal source output, a second signal terminal configured to connect the communications channel to the signal sink input, and at least one ohmic resistor connected in series between the first signal terminal and the second signal terminal, in order to transfer an electrical source signal-originating from the signal source-into an electrical sink signal entering the signal sink, wherein the at least one ohmic resistor of the communications channel with the signal sink input capacitance of the signal sink forms a low-pass filter with a filter cut-off frequency, wherein the low-pass filter subjects the electrical source signal to a low-pass filtering during transfer into the electrical sink signal, wherein, in the communications channel, a series connection of at least two capacitors is connected between the first signal terminal and the second signal terminal and in parallel to the at least one ohmic resistor, and wherein series connection of at least two capacitors raises the filter cut-off frequency of the low-pass filter in comparison with a communications channel without a series connection of at least two capacitors connected in parallel to the at least one ohmic resistor, and thus reduces the low-pass effect of the low-pass filter.

2. The signal transfer assembly according to claim 1, wherein a further ohmic resistor is connected in series to the series connection of at least two capacitors, which is connected in parallel to the at least one ohmic resistor of the communications channel.

3. The signal transfer assembly according to claim 1, wherein at least one of the ohmic resistors provided in the signal transfer assembly is a metal electrode leadless face (MELF) resistor.

4. The signal transfer assembly according to claim 1, wherein the series connection of at least two capacitors is configured to raise the filter cut-off frequency to such an extent that information contained in the electrical source signal and to be transported into the signal sink can be transferred into the electrical sink signal without a loss of information.

5. The signal transfer assembly according to claim 1, wherein a capacitance of each capacitor provided in the series connection is in each case greater than the capacitance of the signal sink input capacitance by at least a predefined factor, the predefined factor corresponding to at least twice the number of capacitors provided in the series connection.

6. The signal transfer assembly according to claim 5, wherein the predefined factor is greater than $1+\sqrt{2}$ times the number of capacitors provided in the series connection.

7. The signal transfer assembly according to claim 1, wherein a fly back diode is connected to the first signal terminal of the communications channel.

8. The signal transfer assembly according to claim 1, wherein a signal driver, which is connected in an electrically conductive manner to the signal sink input in order to amplify the electrical sink signal is provided in the signal sink, and the signal driver has a signal driver input capacitance, which forms the signal sink input capacitance.

9. The signal transfer assembly according to claim 1, wherein a flyback diode is connected to the second signal terminal of the communications channel.

* * * * *